Patented Oct. 6, 1953

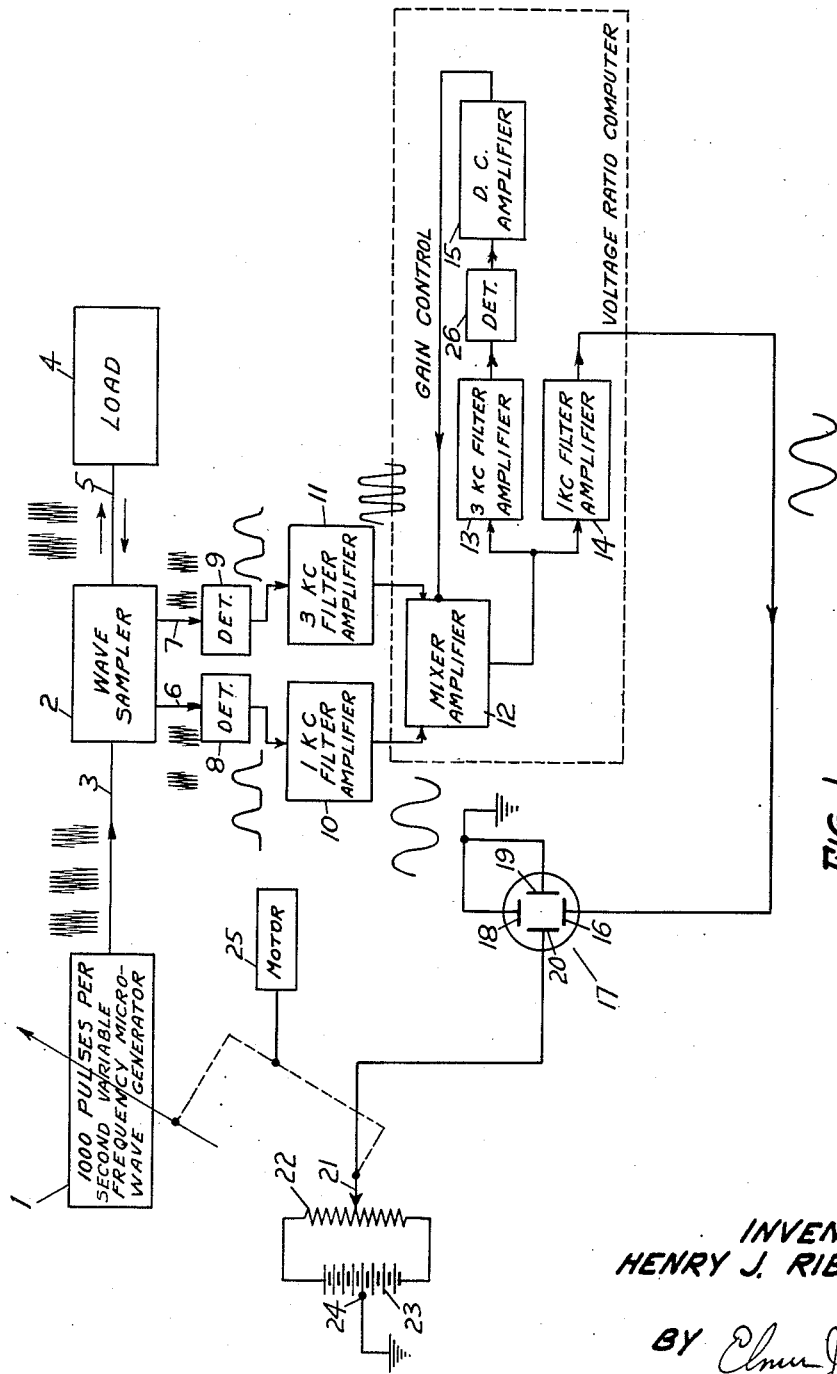

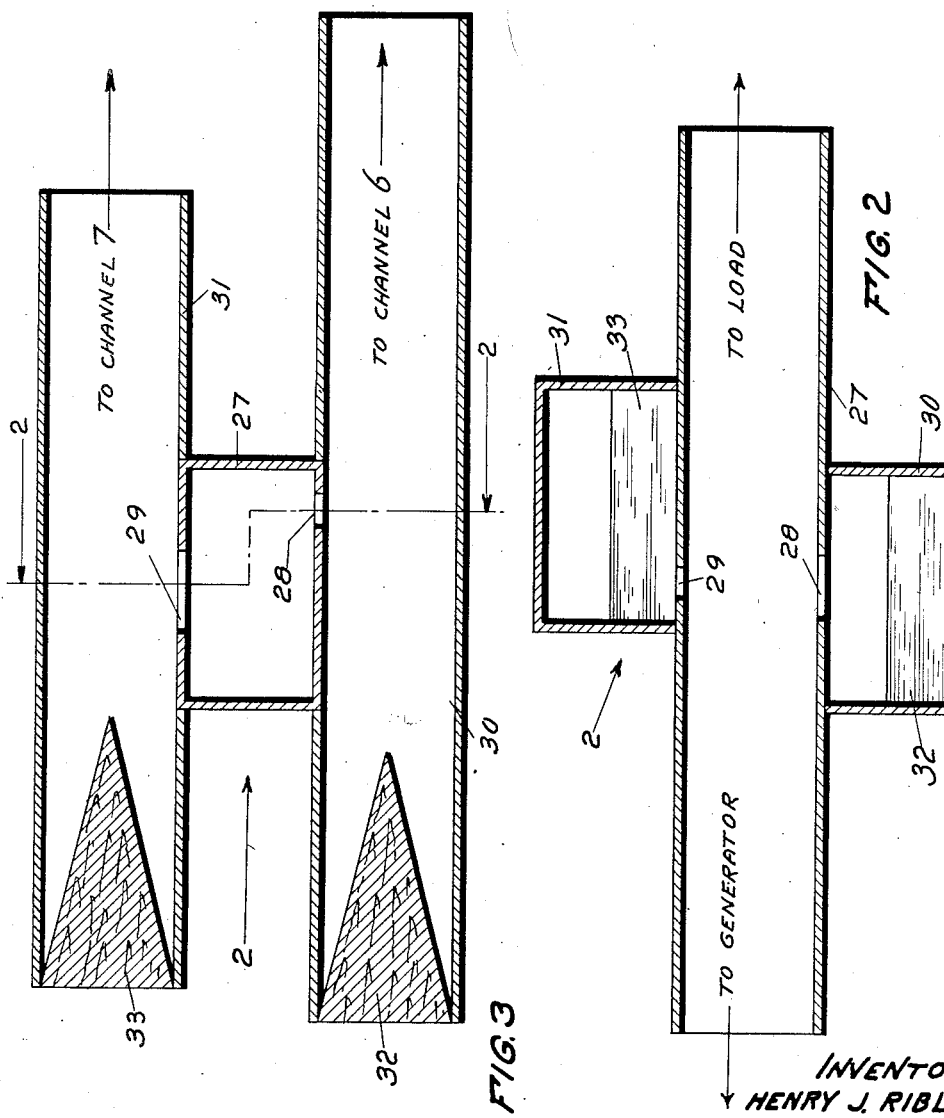

2,654,863

UNITED STATES PATENT OFFICE 2,654,863

MICROWAVE TEST EQUIPMENT

Henry J. Riblet, Belmont, Mass., assignor to Raytheon Manufacturing Company, Newton, Mass., a corporation of Delaware Application December 1, 1949, Serial No. 130,422

3 Claims. (Cl. 324—58)

This invention relates to equipment for determining the standing wave ratio in wave guide structures, and more particularly for determining the degree of mismatch between a load and a wave guide as well as the phase of the load impedance over a wide range of frequencies.

The conventional way of measuring the standing wave ratio in wave guide structures utilizes a longitudinal slot in the wave guide through which a probe pickup may be inserted into the wave guide. Movement of the probe along the slot causes alternate maximum and minimum voltage magnitudes to be induced in the probe, and from these the standing wave ratio may be computed. Also, the phase of the load impedance may be computed where the distance in electrical wave lengths from the load to the probe can be measured.

The present invention comprises a system whereby the standing wave ratio and the phase of the load impedance may be continuously and automatically measured, computed and displayed over a wide range of frequencies. In addition, the need for mechanical movement of a probe in the wave guide is eliminated. This is accomplished by the use of a pickup device connected to the wave guide which is insensitive to variations of frequency. The frequency of the source is varied by a certain predetermined amount, thereby causing a change in the number of electrical wave lengths between the load and the pickup. This causes the pickup, in effect, to move through a plurality of voltage maxima and minima produced by the standing wave, which results from a combination of energy being fed to the load and energy being reflected from the load.

For a frequency-insensitive voltage pickup, the invention may utilize a wave sampler comprising a pair of slots, one in each of the wider sides of the main wave guide. The centers of these slots both lie in a plane which is perpendicular to the direction of propagation of the energy in the guide. In addition, the major axes of these slots are at right angles to each other with the result that the instantaneous energy picked up by the slots differs from each other by a phase of substantially 90 electrical degrees. These slots are each coupled to a separate wave guide and behave in the same manner as probes in the wave guide which are separated from each other by a quarter wave length at all frequencies. The quotient of the amplitudes of the energy fed through these slots is an accurate measure of the standing wave ratio at the maxima and minima.

In order to automatically divide the energy of one slot by the energy of the other slot, applicant modulates the energy source, providing, for example, energy pulses having a repetition rate of 1000 pulses per second. Detection of the energy picked up by the slots then produces non-sinusoidal one kilocycle signals. These are passed through filters, the output of one slot being passed through a filter which passes one kilocycle and the output of the other slot being passed through a filter which passes three kilocycles. The outputs of these filters are fed to a common amplifier, and the resultant amplified signals are again separated by filters. The output of one of the operating filters is used to control the bias of the common amplifier similar to the automatic volume control of conventional radio receivers, thereby causing a decrease in the amplification of the other signal in proportion to the amplitude of the first signal. The other signal now has an amplitude which corresponds to the quotient of the two signals, and measurement of the magnitude of this signal at successive maxima and minima will give a true indication of the magnitude of the standing wave ratio. This invention further provides for continuous display of this quotient by feeding the quotient signal to the vertical deflection plates of a cathode ray tube. The horizontal deflection plates are connected to a source of voltage which varies proportionately with the frequency of the microwave source, with a result that the maxima and minima are displayed on the cathode ray tube screen to form a picture similar to that of the modulation envelope of a conventional amplitude modulated communication signal.

Further advantages of this invention will be apparent as the description thereof progresses, reference being had to the accompanying drawings wherein:

Fig. 1 illustrates a functional block diagram of an electrical system utilizing the present invention;

Fig. 2 illustrates a longitudinal cross-sectional view of the wave sampler shown in Fig. 1 taken along line 2—2 of Fig. 3; and Fig. 3 illustrates a transverse cross-sectional view of the device shown in Fig. 2 taken along line 3—3 of Fig. 2.

Referring now to Fig. 1, there is shown a microwave generator 1, which is tunable over a reltively wide range, for example, ten per cent, of its frequency. This microwave generator may be, for example, a conventional magnetron or klystron which is mechanically tuned in a well-known manner. The output of microwave generator 1 which, as is shown here by way of example, is pulsed at the rate of 1000 pulses per second, is fed to a wave sampler 2 through any desired wave energy transfer means 3 such as, for example, a wave guide.

Microwave energy is fed from energy transfer means 3 through wave sampler 2 to a load 4 through energy transfer means 5, for example, a wave guide. The load 4 may be of any desired impedance whose magnitude and phase are to be measured. It may be, for example, a rotating joint which is being tested to determine its mismatch to energy transfer means 5 over a range of frequencies. The output of the wave sampler is fed into two channels 6 and 7, respectively.

Referring now to Figs. 2 and 3, there is shown a wave sampler particularly adapted for use with wave guide structures. The wave sampler comprises a main wave guide 27, one end of which connects to generator 1 through energy transfer means 3, and the other end of which connects to load 4 through energy transfer means 5. Guide 27, which is rectangular, has a longitudinal slot 28 in the lower side thereof adjacent one of the side walls, and a transverse slot 29 in the upper side thereof. The centers of slots 28 and 29 lie in a plane which is perpendicular to the direction of propagation of energy in guide 27.

Slots 28 and 29 couple energy from guide 27 into auxiliary guides 30 and 31, respectively. One end of guide 30 is connected to channel 6 and the other end thereof terminates in energy absorbent material 32. Similarly, one end of guide 31 is connected to channel 7 and the other end thereof terminates in energy absorbent material 33.

Since slot 29 is energized by electrostatic fields, while slot 28 is energized by electromagnetic fields, the energy propagated in guide 30 differs from the energy propagated in guide 31 by substantially ninety electrical degrees. The construction and operation of this wave sampler are described in greater detail in copending application of Theodore S. Saad, Serial No. 30,041, filed May 29, 1948, now Patent No. 2,636,082, dated April 21, 1953.

Channels 6 and 7 feed microwave detectors 8 and 9, respectively, which may be of any desired type, such as crystals, barretters or thyrite elements. The outputs of the detectors which produce a signal of the frequency of the pulses of the microwave source are nonsinusoidal and conform substantially to the modulation envelope of the microwave signal. The output of detector 8 is fed through a sharply-tuned filter amplifier 10 which passes one kilocycle signals, while the output of detector 9 is fed to a sharply-tuned filter amplifier 11 which passes three kilocycle signals. The outputs of filter amplifiers 10 and 11 are fed to a common mixer amplifier 12. The output of mixer amplifier 12 is fed to a three kilocycle filter amplifier 13 which passes three kilocycle signals, and to a one kilocycle amplifier 14 which passes one kilocycle signals. The output of the three kilocycle filter amplifier 13 feeds a detector 26, which, in turn, feeds a direct current amplifier 15. The output of amplifier 15 is used to control the gain of the mixer amplifier 12, for example, by being applied to the bias control of variable mu tubes in amplifier 12. The detector 26 is of such a polarity that the output of amplifier 15 reduces the gain of amplifier 12 as the magnitude of the three kilocycle signal increases. The result is that the output of filter amplifier 14 varies as the ratio of the amplitude of the signal in channel 6 to the amplitude of the signal in channel 7.

This voltage ratio computer is disclosed by way of example only, and any mechanical or electrical computer which would perform the desired function could be used.

The output of filter amplifier 14 is fed to a vertical deflection plate 16 of a cathode ray tube 17, the opposite vertical deflection plate 18 being grounded. One of the horizontal deflection plates 19 is grounded and the other horizontal deflection plate 20 is connected to the movable arm 21 of a potentiometer 22, whose ends are connected across a battery 23, a center plate 24 of which is grounded. Movable arm 21 is mechanically ganged to the tuning arrangement of microwave generator 1, said arm and tuning arrangement having simultaneous motion imparted thereto by any desired means, such as motor 25.

Energization of motor 25 causes potentiometer arm 21 to move from one end of potentiometer 22 to the other, thereby causing the trace of the cathode ray tube 17 to move horizontally across the screen. Simultaneously, microwave generator 1 is tuned, causing successive maxima and minima of the standing wave in energy transfer means 5 to be picked up by wave sampler 2. These maxima and minima are fed through the voltage ratio computer and applied to the vertical deflection plates of the cathode ray tube causing displacement of the trace vertically in proportion to the magnitude of the maxima and minima. These maxima and minima may be measured directly on the cathode ray tube screen, or the presentation on the screen may be photographed and measurement made from the photograph. The number of maxima and minima which will appear across the screen of the cathode ray tube will be proportional to the number of electrical wave lengths separating wave sampler 2 and load 4 and to the magnitude of the frequency change of microwave generator 1.

For example, if wave sampler 2 is separated from load 4 by a wave guide of 100 electrical wave lengths at a given frequency of microwave generator 1, and the frequency of microwave generator 1 is increased by ten per cent, the number of electrical wave wave lengths between wave sampler 2 and the load 4 will be increased by ten per cent or by ten wave lengths. Since there are two maxima and two minima in each wave length, 20 maxima and 20 minima will have passed through wave sampler 2 during the ten per cent increase in the frequency of microwave generator 1. These maxima and minima are fed through the detector filter and ratio computer systems and will be displayed on the screen of cathode ray tube 17. By measuring the amplitude differences between successive maxima and minima over the range of frequencies, the variation of the impedance match of load 4 to energy transfer means 5 may be determined.

Further, if the effective electrical wave length of energy transfer means 5 is known, the phase of the load impedance may be ascertained from the position of the maxima and minima on the cathode ray tube 17. If the electrical wave length is unknown, the cathode ray tube may be calibrated by substituting a short circuit for load 4.

and ascertaining the position of the maxima and minima on the cathode ray tube, this position corresponding to an impedance phase of plus 90 degrees. The phase of the load impedance may then be ascertained by linear interpolation between successive maxima and minima.

Equipment built in accordance with this invention enabled measurement of load impedance phase with an accuracy of plus or minus four degrees and a standing wave ratio with an accuracy of plus or minus eight per cent over a twelve per cent frequency range centered in the three-centimeter band.

This completes the description of the embodiment of the invention illustrated herein. However, many modifications thereof will be apparent to persons skilled in the art. For example, the microwave generator may be electronically tuned and the horizontal sweep for cathode ray tube 17 may be electronically generated, and, indeed, any desired indicating means, for example a meter, may be used instead of cathode ray tube 17. Also, the microwave generator may be sinusoidally modulated rather than pulse modulated and, indeed, the device may be used with a computer which does not require a common amplifier 12, in which case the microwave generator need not be modulated. Therefore, applicant does not wish to be limited to the specific details of the embodiment of the invention illustrated herein except as defined by the appended claims.

What is claimed is:

1. An electromagnetic device comprising a source of electromagnetic energy, means for transferring energy from said source to a load, means connected to said transferring means for measuring the magnitude of said energy in said transferring means at a pair of discrete points, means responsive to said measuring means for computing the quotient of the amplitude of the energy at one of said points with respect to the amplitude of the energy at the other of said points, means for varying the number of electrical wave lengths of said energy between said load and said measuring means, and means responsive to said computing means and said means for varying the number of electrical wave lengths for continuously displaying the relation between said quotient and said number of electrical wave lengths.

2. An electromagnetic device comprising a source of electromagnetic energy, means for transferring energy from said source to a load, means connected to said transferring means for measuring the magnitude of said energy in said transferring means at a pair of discrete points, means for varying the number of electrical wave lengths of said energy between said load and said measuring means comprising means for varying the frequency of said source, means responsive to said measuring means for computing the quotient of the amplitude of the energy at one of said points with respect to the amplitude of the energy at the other of said points, and means responsive to said computing means and said means for varying the number of electrical wave lengths for continuously displaying the relation between said quotient and the frequency of said energy.

3. An electromagnetic device comprising a source of electromagnetic energy, means for transferring energy from said source to a load, means connected to said transferring means for measuring the magnitude of said energy in said transferring means at a pair of discrete points, means for varying the number of electrical wave lengths of said energy between said load and said measuring means comprising means for cyclically varying the frequency of said source, means responsive to said measuring means for computing the quotient of the amplitude of the energy at one of said points with respect to the amplitude of the energy at the other of said points, and means comprising a cathode ray tube responsive to said computing means for continuously displaying the relation between said quotient and the frequency of said energy.

HENRY J. RIBLET.

References Cited in the file of this patent

UNITED STATES PATENTS

| Number | Name | Date |
|---|---|---|
| 2,442,606 | Korman | June 1, 1940 |
| 2,454,042 | Dettinger | Nov. 16, 1948 |
| 2,456,800 | Taylor et al. | Dec. 21, 1948 |
| 2,479,650 | Tiley | Aug. 23, 1949 |
| 2,482,173 | Hagstrum | Sept. 20, 1949 |
| 2,562,281 | Mumford | July 31, 1951 |
| 2,573,402 | Chapman | Oct. 30, 1951 |
| 2,580,678 | Hansen et al. | Jan. 1, 1952 |
| 2,605,323 | Samuel | July 29, 1952 |

OTHER REFERENCES

"Proceedings of the I. R. E.," vol. 36, No. 12, Dec. 12, 1948, pages 1493 to 1499, presented, 1948 I. R. E. National Convention, March 24, 1948, New York, New York.